May 30, 1950          E. M. SCHWENK          2,509,457
PEDAL EXTENSION ACCESSORY FOR BICYCLES
Filed Nov. 15, 1948
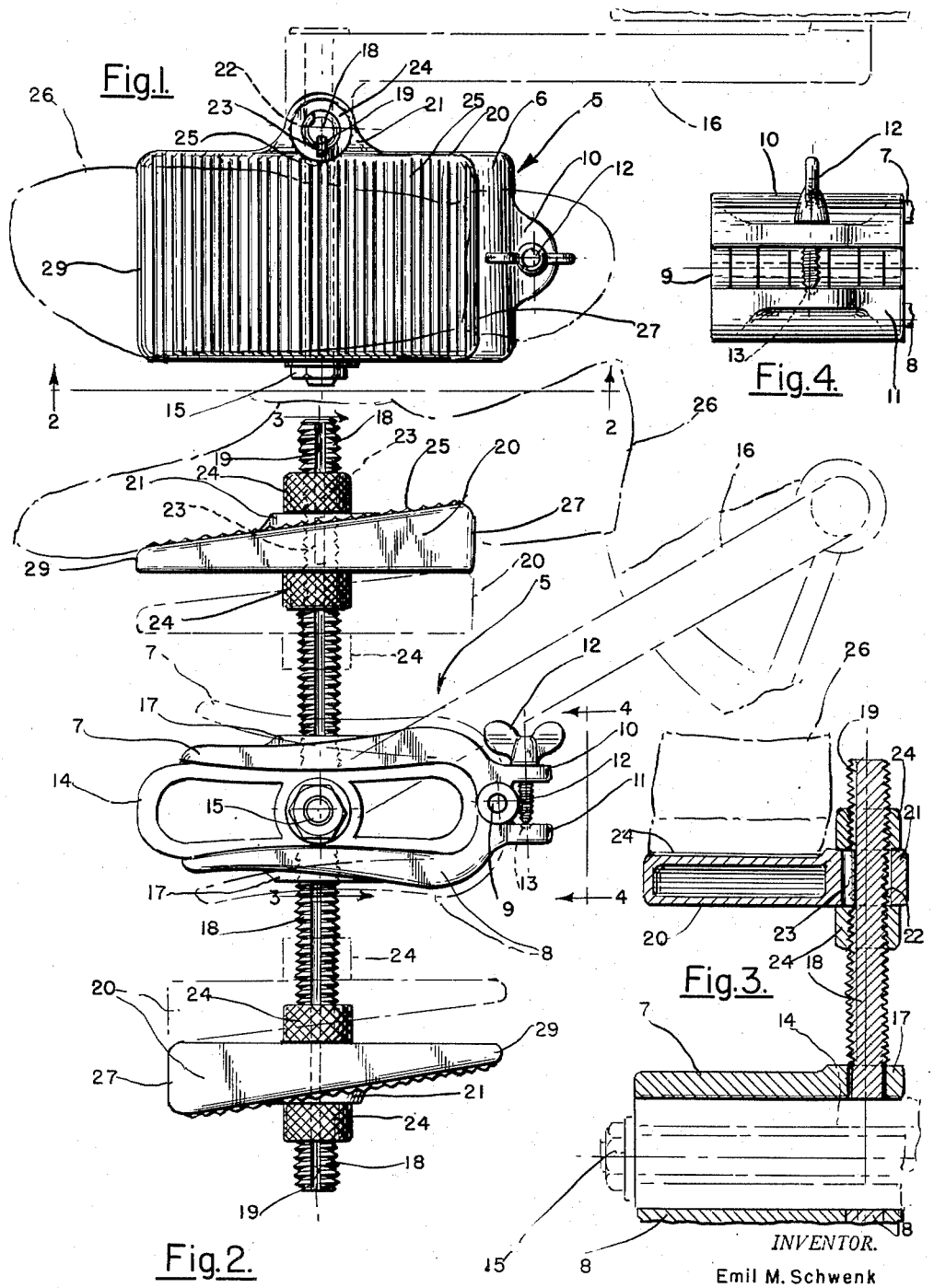
INVENTOR.
Emil M. Schwenk
BY
David Manley Heller
Attorney Patented May 30, 1950

2,509,457

UNITED STATES PATENT OFFICE 2,509,457

PEDAL EXTENSION ACCESSORY FOR BICYCLES

Emil M. Schwenk, Chicago, Ill.

Application November 15, 1948, Serial No. 60,060

2 Claims. (Cl. 74—594.4)

My invention relates to pedal extension accessories for bicycles.

Since small children are unable to sit on the seat of a standard size bicycle and reach the pedals with their feet, they are obliged to ride standing on the pedals which is awkward and dangerous, or wooden blocks are attached to the said pedals which is a makeshift and non-adjustable substitute. Therefore, I have provided an adjustable pedal extension accessory for bicycle pedals which can be adjusted from time to time to meet the requirements of the leg length of the growing child, or which may be quickly and easily adjusted to meet the requirements of different children of different sizes.

A most important object of my invention is to provide pedal extension accessories for bicycles which may be quickly attached to the pedals thereof without the use of tools.

A further important object of my invention is to provide pedal extension accessories for bicycles, having extension pedals which are held adjustably in place by suitable means to permit proper height adjustments thereof.

A further object of my invention is to provide a pedal extension accessory for bicycles which is of lightweight construction and which may be economically produced in large quantities.

Other objects and advantages inherent in my invention will be disclosed in the following description and the accompanying illustrations in which like parts are designated by like numerals and in which;

Fig. 1 is a top view of my invention shown attached to the pedal of a bicycle.

Fig. 2 is a side view of my invention taken looking in the direction of lines 2—2 on Fig. 1 and showing the adjustment features of the extension pedals.

Fig. 3 is a fragmentary cross-sectional view of my invention taken substantially on line 3—3 on Fig. 2.

Fig. 4 is a fragmentary view of the clamping means of my invention taken looking in the direction of lines 4—4 on Fig. 2.

Referring to the illustrations, my invention is generally designated 5 and consists of an articulated pedal clamp 6 having upper and lower jaws 7 and 8, which are pivoted at 9. The said upper and lower jaws 7 and 8 are of a slightly convex formation to fit the concave surface formation of the bicycle pedal 14. A set screw extension 10 is formed adjacent the pivot portion 9 on upper jaw 7 and a mating dimpled extension 11 is formed adjacent the pivot portion 9 on lower jaw 8. The set screw extension 10 is tapped at 28 for a wing head set screw 12, the rounded free end of which contacts dimple 13 on the upper surface of dimpled extension 11. Thus, by tightening wing head set screw 12, the articulated pedal clamp 6 may be firmly attached to a bicycle pedal 14. The attaching ends of adjustment stud bolts 18 are fixed at right angles to lugs 17 formed on the inner edges of upper and lower jaws 7 and 8 so that the said adjustment stud bolts 18 are radially and oppositely aligned with respect to the pivot pin 15 of bicycle pedal 14 which is shown mounted on pedal arm 16 drawn in phantom lines in Figs. 1 and 2.

Extension pedals 20 are formed preferably of a lightweight material such as aluminum and are tapered in cross section from the heel portion 27 to the toe portion 29 to fit the contour of the sole of a shoe designated 26. The top surface 25 may be roughened as shown to provide a good gripping surface thereon. The said extension pedals 20 have attaching ears 21 formed on their inner edges which have pedal extension mounting holes 22 bored therethrough. The said extension pedals 20 are mounted over adjustment stud bolts 18 by means of pedal extension mounting holes 22 and are held adjustably in place by knurled lock nuts 24, one above and one below as shown in Fig. 2. Keyways 19 are formed longitudinally on adjustment stud bolts 18 to cooperate with pedal locating keys 23 which are frictionally secured within the pedal extension mounting holes 22. The said keyways 19 and pedal locating keys 23 provide locating and non-rotatable holding means for the extension pedals 20 on adjustment stud bolts 18. To attach my pedal extension accessory for bicycles upon the pedals of a bicycle, the wing head set screw 12 of articulated pedal clamp 6 is loosened to permit the jaws 7 and 8 thereof to engage the top and bottom surfaces of bicycle pedal 14. The wing head set screw 12 is tightened to provide a secure clamping means of the articulated pedal clamp 6 over bicycle pedal 14. By turning knurled lock nuts 24, the extension pedal 20 may be adjusted to the proper height or distance from pedal 14.

An example of the use of my pedal extension accessory for bicycles would be to adjust the extension pedal 20 near the top end of adjustment stud bolts 18 as shown in Fig. 2 for a small child. As the child grows in height, the said extension pedals 20 would be adjusted from time to time to lower positions on stud bolts 18, that is, positions nearer the bicycle pedal 14 as shown by phantom lines in Fig. 2. Since the adjusting means of the extension pedals 20 are so quickly and easily performed, the pedal extension accessory may be used by different sized children or adults using the same bicycle. When the child is full grown, or when an adult wishes to use the bicycle, the pedal extension accessory may be quickly and easily removed from pedal 14 merely by loosening wing head set screws 12 and removing the pedal extension 5 from bicycle pedal 14. The adjustment stud bolts 18, being located along the inner edges of articulated pedal clamps 6 and extension pedal 20, will in no way interfere with the placing of the foot designated 26 on extension pedals 20.

It may be further added that my pedal extension accessories add to the appearance of the bicycle and in no way detract from the performance thereof.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new and desire to secure by Letters Patent is:

1. Pedal extension accessory for bicycles comprising, articulate clamp means adapted to be removably secured to bicycle pedals of varied thicknesses, adjustment stud bolts secured to the said articulated clamp means in vertical axial alignment, extension pedal means mounted adjustably on the said stud bolts, nut and lock nut means securing the said extension pedal means in varied adjustments, the said articulate clamp means being provided with extended ears endwise, clamp screw means secured to one of said ears and in abutment against the other of said ears to effectuate releasable clamping of the said articulate clamp means, the said stud bolts being provided with longitudinal keyways, the said articulate clamp means being further provided with side lugs having bores therethrough, and key means secured within the said bore and in sliding engagement with the said keyways.

2. Pedal extension accessory for bicycles comprising, articulate clamp means adapted to be removably secured to bicycle pedals of varied thicknesses, adjustment stud bolts secured to the said articulated clamp means in vertical axial alignment, extension pedal means mounted adjustably on the said stud bolts, nut and lock nut means securing the said extension pedal means in varied adjustments, the said articulate clamp means being provided with extended ears endwise, clamp screw means secured to one of said ears and in abutment against the other of said ears to effectuate releasable clamping of the said articulate clamp means, the said extension pedal means being of triangular cross-sectional configuration longitudinally and roughened to assure frictional engagement thereof by a rider's shoe, the said stud bolts being provided with longitudinal keyways, the said articulate clamp means being further provided with side lugs having bores therethrough, and key means secured within the said bore and in sliding engagement with the said keyways.

EMIL M. SCHWENK.

REFERENCES CITED

The following references are of record in the file of this patent:

UNITED STATES PATENTS

| Number | Name | Date |
| --- | --- | --- |
| 600,251 | D'Albert | Mar. 8, 1898 |
| 707,706 | Lotspeich | Aug. 26, 1902 |
| 1,128,975 | Harrington | Feb. 16, 1915 |
| 1,484,847 | Rivers et al. | Feb. 26, 1924 |
| 1,521,976 | Swain | Jan. 6, 1925 |
| 1,972,701 | Carlson | Sept. 4, 1934 |
| 2,124,100 | Bailey | July 19, 1938 |

FOREIGN PATENTS

| Number | Country | Date |
| --- | --- | --- |
| 28,328 | Great Britain | May 15, 1897 |
| 351,755 | France | July 25, 1905 |
| 322,067 | Germany | Sept. 5, 1912 |
| 18,090 (Addition) | France | Aug. 13, 1913 |